C. DRABEK.
COMBINED SPRING AND SPRING AND LEVER SUSPENSION FOR VEHICLES.
APPLICATION FILED AUG. 17, 1916.

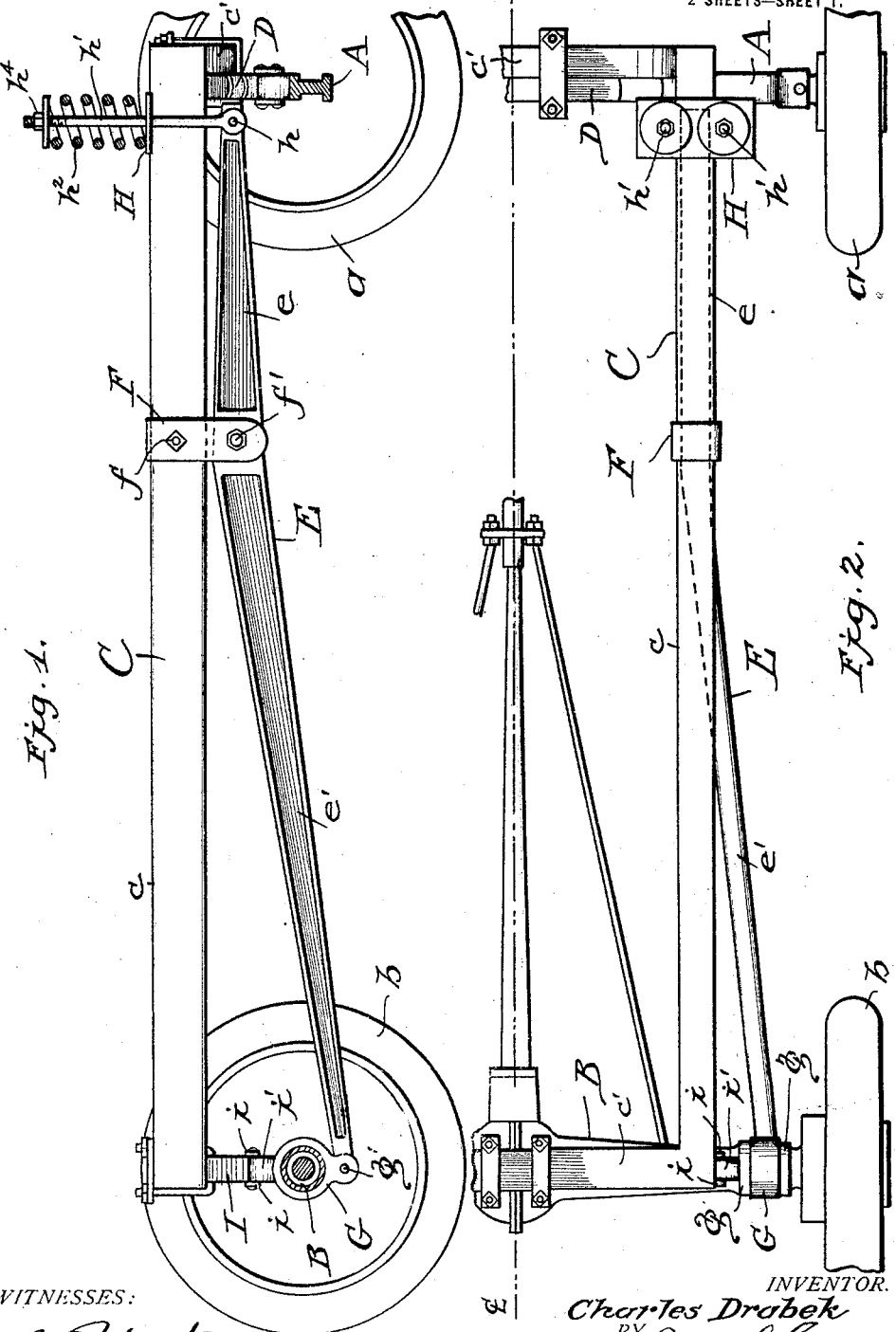

1,393,095.

Patented Oct. 11, 1921.

WITNESSES:
C. Gabriske

INVENTOR.
Charles Drabek.
BY
Jas. H. Griffin
ATTORNEY.

UNITED STATES PATENT OFFICE.

CHARLES DRABEK, OF CLEVELAND, OHIO.

COMBINED SPRING AND SPRING AND LEVER SUSPENSION FOR VEHICLES.

1,393,095.   Specification of Letters Patent.   Patented Oct. 11, 1921.

Application filed August 17, 1916. Serial No. 115,374.

*To all whom it may concern:*

Be it known that I, CHARLES DRABEK, a citizen of the United States, residing in Cleveland, county of Cuyahoga, State of Ohio, have invented a certain new and useful Combined Spring and Spring and Lever Suspension for Vehicles, of which the following is a specification.

This invention is a combined spring and spring and lever suspension for vehicles and constitutes an improvement on my prior inventions forming the subject matter of Patent No. 1,119,937 of December 8, 1914, and application Serial No. 99,771, filed May 25, 1916.

The object of the invention is to improve and simplify the constructions of my prior inventions without, in the least, detracting from the efficiency of such constructions but, rather, increasing their efficiency.

More specifically, the object of the invention may be stated as embodying the production of an automobile chassis wherein the full benefits of spring and lever suspension are availed of, yet wherein the disadvantages generally inherent in such constructions are obviated by providing maximum lateral rigidity for the purpose of precluding side sway, thereby facilitating the steering of the vehicle. In other words, the object of the invention may be briefly stated as the provision of a vehicle chassis wherein all the benefits of cantaliver devices are embodied, yet their disadvantages obviated.

The preferred form of the invention embodies a construction wherein the forward part of the frame of the chassis is supported from the front axle by any well known form of leaf spring connection, such, *e. g.*, as the semi-elliptical or elliptical spring commonly employed, while the remaining portion of the chassis frame is supported on the back axle through the medium of a pair of levers of the first class pivoted to the chassis frame, with the long arms of the levers connected to the rear axle and the short arms of the levers connected, through resilient devices, to the chassis frame. The construction specified provides a connection between the frame and front axle which is laterally rigid, thereby facilitating the steering of the vehicle, while all the advantages of the cantaliver lever suspension are obtained through the spring and lever connections with the back axle.

Features of the invention, other than those specified, will be apparent from the hereinafter detailed description taken in conjunction with the accompanying drawings.

In the accompanying drawings I have illustrated one practical embodiment of the invention, but the construction therein shown is to be understood as illustrative, only, and not as defining the limits of the invention.

Figure 1 is a side elevation of a chassis embodying the present invention. In the interest of clearness, the axles are shown in section and the two near wheels omitted.

Fig. 2 is a view showing in plan the greater portion of the chassis shown in Fig. 1.

Figure 3:
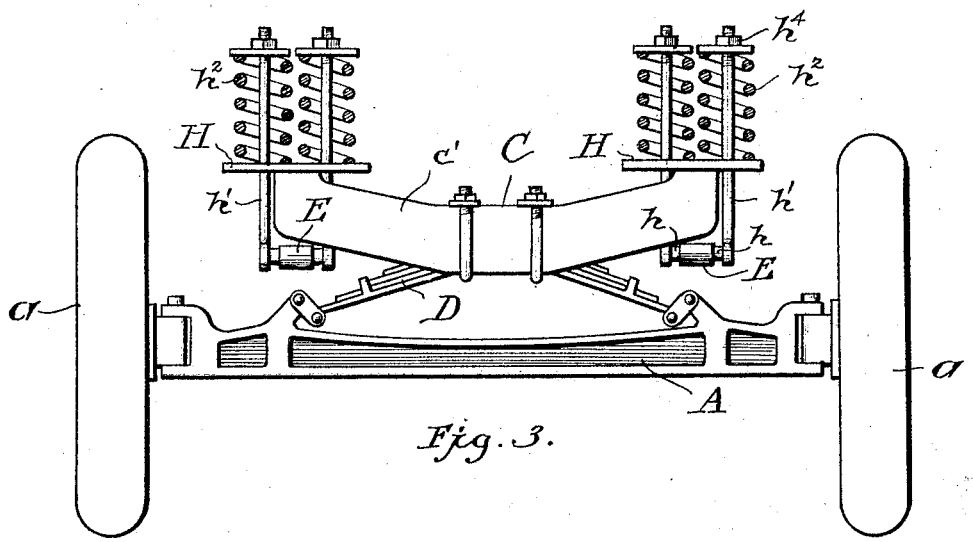
Fig. 3 is a front elevation of the chassis.

Referring to the drawings, the running gear is shown as embodying a front axle A, supported by wheels *a* and a rear axle B, supported by wheels *b*. Positioned above the axles is the usual rigid frame C, composed of two longitudinal side beams *c*, and transverse spacing beams *c'*. Frame C, which forms the load-carrying member of the vehicle, may be of any well known and conventional form and may be built up from channel beams or any other suitable structural shape.

The front of the chassis is supported on the front axle A in the usual manner, *e. g.*, through the medium of a semi-elliptical spring D which is built up from a plurality of leaves in the usual manner, secured at its center to the front spacing beam *c'* and connected at its opposite ends, by means of suitable shackles, to the front axle A, all as is common and well known.

With the front axle are associated the usual steering knuckles and spindles, with which is combined any well known form of steering gear so that the forward part of the machine is, in the main, constructed after well known and commonly employed principles of construction. Side sway of the vehicle frame at its forward end is, therefore, precluded and the steering operation is carried on as normally through the rigid lateral connections specified.

Combined with this well known form of front axle arrangement is a spring and lever suspension associated with the back axle. This suspension embodies a pair of levers E of the first class which extend longitudinally of the vehicle frame and are pivoted to the opposite side beams c thereof. The fulcruming of levers E intermediate their ends to the side beams c of the frame may be accomplished in various ways, such as shown in my prior patent and application hereinbefore referred to, but, for the purpose of illustration, said levers are shown as pivoted immediately below, and in the plane of, their respective side bars by means of hangers designated F. Each of the hangers F is in the form of an inverted, substantially U-shaped metallic strap which is positioned over one of the side beams c and is secured thereto by a bolt f. The ends of each strap F depend below the lower edge of the beam and embrace one of the levers E, and a bolt f' extends through the depending portions of the strap and through lever E. Bolts f' thus serve as fulcrums for levers E and pivotally secure said levers beneath the frame and in substantially the same vertical plane as the respective side beams c with which they are associated.

Each of the levers E is preferably so proportioned that its arms are of unequal length, the short arm e of which extends forwardly of the load-carrying member to substantially the front end thereof, while the long arm e' extends rearwardly beneath the load-carrying member and is secured in any suitable manner to the rear axle B. The attachment between the long arms e' and the rear axle may vary, but, for the purpose of illustration, said connection is shown as embodied in a hanger G. A portion of each hanger G embraces the rear axle B and is adapted for pivotal movement thereon, but is precluded from movement longitudinally of the axle by means of a pair of collars g, one of which is fixed to the axle on either side of hanger G. Hangers G are each provided with a depending eyelet and the ends of the levers are similarly formed so that a pin g' may be passed through the eyelet and the end of the lever for the purpose of pivoting the end of the lever to the hanger G.

At the forward or free ends of the short arms e of the levers are laterally extending trunnions h, to the outer ends of which are pivoted upstanding posts h', which posts extend upwardly through apertures in a plate H secured to each side beam c, so as to laterally overhang said beam, said posts extending upwardly on either side of the side beam and through the aperture specified. Posts h' project upwardly beyond plate H, and around each post is coiled a helical spring $h^2$. The upper ends of posts h' are threaded to receive nuts $h^4$, and washers are interposed between the nuts and the helical springs $h^2$ so that, when the nuts are screwed down, the helical springs are placed under tension.

Figure 4:
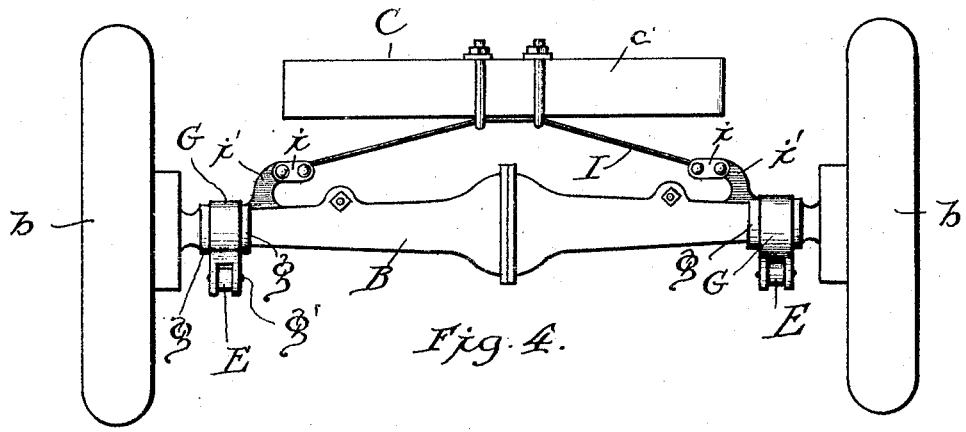
Fig. 4 is a rear elevation thereof.

Means is preferably associated with the rear axle to preclude side sway of the rear portion of the load-carrying member, and this means is shown as embodying a lateral stiffening strap I which is secured at its opposite ends to the rear axle by means of shackles i mounted on upstanding fingers i' fixed on said rear axle. Strap I is secured intermediate its ends to the rear cross-beam c' of the load-carrying member, as clearly shown in Figs. 1 and 4. This construction allows of pivotal movement of the levers, but ties the rear end of the load-carrying member to the rear axle B in such manner as to preclude side sway of the load-carrying member at its rear end.

Figure 5:
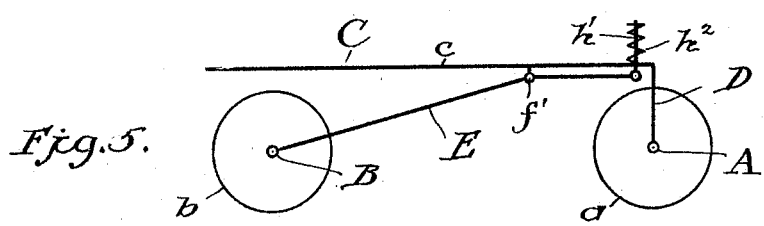
Fig. 5 is a diagrammatic side elevation.

The mode of operation of a vehicle chassis organized as described may best be explained with reference to Fig. 5 of the drawings, which diagrammatically shows the construction of the chassis. In this figure only one side beam c of the load-carrying member and only one lever E are shown, in the interest of simplicity. Beam c, with forward semi-elliptical spring D rigidly secured thereto, forms in effect a bell-crank lever which is fulcrumed on front axle A. The elbow end of the bell-crank, which forms the front end of the chassis frame or load-carrying member, is supported directly upon the front axle through spring D, while the rest of the rearwardly extending frame or load-carrying member is supported through the medium of lever E which is pivoted at f' to side beam c. Even assuming that the short arm e of the lever had a fixed connection with beam c, the rear end of the load-carrying member would be properly sustained in elevated position, and all the resiliency of the frame inherent in the structural metal frame and the natural resiliency of lever E would coöperate to dampen the jar or vibration received by the rear wheel, so that no appreciable jar or vibration would be felt in the load-carrying member. This being true of the rigid connection, such jar or vibration is absolutely done away with by providing the flexible or resilient connection embodied in the helical spring $h^2$. Moreover, by forming the arms of each lever E of unequal length and associating the back axle with the long arm of the lever, the movement of the short arm occasioned by the jars received by the long arm will be decimated with respect to such movements of the long arm, so that the full benefits of the nullifying action of the levers are availed of. The rear portion of the vehicle body may thus be said to be supported on a double lever suspension (levers E being spoken of as one lever in this instance, and the bell-crank formed by load-carrying member C and spring D being referred to as the other lever). It will thus appear that the operation in the chassis of this invention is founded upon principles different from those of my two prior inventions hereinbefore referred to.

Attention is also called to the fact that, by rearwardly extending the load-carrying member beyond the back axle, the weight on the load-carrying member may be imposed to a still greater extent on the rear axle than on the front axle. In Fig. 5, for the purpose of illustrating this point, the load-carrying member is shown as extended rearwardly beyond the back axle, and it will be manifest from a consideration of the mechanics involved herein that, if this rearward extension is far enough, and the weight to be carried by the load-carrying member is imposed sufficiently far rearwardly of the rear axle and is of sufficient ponderosity, such weight might even tend to raise the front wheels off the ground. This, of course, is not desirable, but is simply mentioned as showing that the desired apportioning of the weight upon the respective axles may be readily obtained in a construction embodying this invention.

In the foregoing description I have set forth the preferred embodiment of this invention, yet it is to be understood that the structure described and shown in the drawings is illustrative, only, and may embody, if desired, certain features of construction forming part of my two prior inventions. For this reason, the present invention is to be understood to be as broadly novel as is commensurate with the appended claims.

It will be manifest from the foregoing description that the member I serves as a tension member in the preferred embodiment of this invention and has no function as the spring which is generally employed at the rear of the vehicle. This tension member may be either in the form of a metallic strap, a chain, or, if desired, a flexible cable may be employed.

In the preferred embodiment of the invention illustrated, it will be noted that at least two-thirds or three-fourths of the length of the load carrying member extends rearwardly of the fulcrums $f'$ of the levers E and this portion has no direct connection with the rear axle other than said levers. This overhanging portion may thus be said to be, in a measure, suspended above the rear axle and, when such construction is employed, the movements imparted to the load carrying member from the rear axle are imparted thereto only through the reducing levers. The result is that such movements occasioned by jar or vibration are practically obviated.

Having thus fully described the invention, what I claim as new, and desire to secure by Letters Patent, is:

1. In a vehicle, a load-carrying member, a front axle, a rear axle, and a spring interposed between the load-carrying member and the front axle for supporting the front end of the load-carrying member, in combination with a pair of levers of the first class having arms of unequal length fulcrumed to the load-carrying member, the fulcrum points of said levers being forwardly of the transverse medial line of the load carrying member, with the long arms of the levers extending from their fulcrums to the rear axle and secured thereto, and resilient means coöperating with the short arms of the levers and the load-carrying member for supporting the rear portion of the load-carrying member, said rear portion of the load carrying member being otherwise without substantial support.

2. In a vehicle, a load-carrying member, a front axle, a rear axle, and direct connections between the front axle and the forward end of the load-carrying member for supporting the load-carrying member at its forward end, in combination with a pair of levers of the first class having arms of unequal length fulcrumed to the load-carrying member, the fulcrum points of said levers being forwardly of the transverse medial line of the load carrying member, with the long arms of the levers extending from their fulcrums to the rear axle and secured thereto, and resilient means coöperating with the short arms of the levers and the load-carrying member for supporting the rear portion of the load-carrying member, said rear portion of the load carrying member being otherwise without substantial support.

3. In a vehicle, a load-carrying member, a front axle, a rear axle, and connections between the front end of the load-carrying member and the front axle for supporting the load-carrying member at its forward end, in combination with a pair of levers of the first class having arms of unequal length fulcrumed to the load-carrying member, the fulcrum points of said levers being forwardly of the transverse medial line of the load carrying member, with the long arms of the levers extending from their fulcrums to the rear axle and secured thereto, and resilient means coöperating with the short arms of the levers and the load-carrying member for supporting the rear portion of the load-carrying member, said rear portion of the load carrying member being otherwise without substantial support.

4. In a vehicle, a load-carrying member, a front axle, a rear axle, and a spring interposed between the load-carrying member and the front axle for supporting the front end of the load-carrying member, in combination with a pair of levers of the first class having arms of unequal length fulcrumed to the load-carrying member, the fulcrum points of said levers being forwardly of the transverse medial line of the load carrying member, with the long arms of the levers extending from their fulcrums to the rear axle and secured thereto, and a spring associated with the short arms of the levers and coöperating with the load-carrying member for supporting the rear portion of the load-carrying member, said rear portion of the load carrying member being otherwise without substantial support.

5. In a vehicle, a load-carrying member, a front axle, a rear axle, and direct connections between the front axle and the forward end of the load-carrying member for supporting the load-carrying member at its forward end, in combination with a pair of levers of the first class having arms of unequal length fulcrumed to the load-carrying member, the fulcrum points of said levers being forwardly of the transverse medial line of the load carrying member, with the long arms of the levers extending from their fulcrums to the rear axle and secured thereto, and a spring associated with the short arms of the levers and coöperating with the load-carrying member for supporting the rear portion of the load-carrying member, said rear portion of the load carrying member being otherwise without substantial support.

6. In a vehicle, a load-carrying member, a front axle, a rear axle, and connections between the front end of the load-carrying member and the front axle for supporting the load-carrying member at its forward end, in combination with a pair of levers of the first class having arms of unequal length fulcrumed to the load-carrying member, the fulcrum points of said levers being forwardly of the transverse medial line of the load-carrying member, with the long arms of the levers extending from their fulcrums to the rear axle and secured thereto, and a spring associated with the short arms of the levers and coöperating with the load-carrying member for supporting the rear portion of the load-carrying member, said rear portion of the load carrying member being otherwise without substantial support.

7. In a vehicle, a load-carrying member, a front axle, a rear axle, and connections between the front axle and the front end of the load-carrying member for supporting said load-carrying member at its forward end, in combination with a pair of levers of the first class having arms of unequal length fulcrumed to the load-carrying member, the fulcrum points of said levers being forwardly of the transverse medial line of the load-carrying member, with the long arms of the levers extending from their fulcrums to the rear axle and secured thereto, and a spring-controlled rod coöperating with the load-carrying member and secured to the end of the short arm of each lever for the purpose of resiliently supporting the rear portion of the load-carrying member, said rear portion of the load-carrying member being otherwise without substantial support.

8. In a vehicle, a load-carrying member, a front axle, a rear axle, and connections between the front axle and the front end of the load-carrying member for supporting said load-carrying member at its forward end, in combination with a pair of levers of the first class having arms of unequal length fulcrumed to the load-carrying member, the fulcrum points of said levers being forwardly of the transverse medial line of the load-carrying member, with the long arms of the levers extending from their fulcrums to the rear axle and secured thereto, a rod associated with the short arm of each lever, and cushioning means coöperating with the load-carrying member for controlling the operations of the piston for the purpose of resiliently supporting the rear portion of the load-carrying member, said rear portion of the load-carrying member being otherwise without substantial support.

9. In a vehicle, a load-carrying member, a front axle, a rear axle, and connections between the front axle and the front end of the load-carrying member for supporting said load-carrying member at its forward end, in combination with a pair of levers of the first class having arms of unequal length fulcrumed to the load-carrying member, the fulcrum points of said levers being forwardly of the transverse medial line of the load-carrying member, with the long arms of the levers extending from their fulcrums to the rear axle and secured thereto, a rod pivoted to the free end of the short arm of each lever, and a spring mounted on the load-carrying member and coiled around the piston for controlling the operations thereof, for the purpose of resiliently supporting the rear portion of the load-carrying member, said rear portion of the load-carrying member being otherwise without substantial support.

10. In a vehicle, a load-carrying member, a front axle, a rear axle, and connections between the front axle and the front end of the load-carrying member for supporting said load-carrying member at its forward end, in combination with a pair of levers of the first class having arms of unequal length fulcrumed to the load-carrying member, the fulcrum points of said levers being forwardly of the transverse medial line of the load-carrying member, with the long arms of the levers extending from their fulcrums to the rear axle and secured thereto, a rod pivoted to the free end of the short arm of each lever, a spring mounted on the load-carrying member and coiled around the piston for controlling the operations thereof, for the purpose of resiliently supporting the rear portion of the load-carrying member, and means for varying the tension of said spring, said rear portion of the load-carrying member being otherwise without substantial support.

11. In a vehicle, a load-carrying member, a front axle, a rear axle, and connections between the front end of the load-carrying member and the front axle for supporting the load-carrying member at its forward end, in combination with a pair of levers of the first class having arms of unequal length fulcrumed to the load-carrying member, the fulcrum points of said levers being forwardly of the transverse medial line of the load-carry member, with the long arms of the levers extending from their fulcrums to the rear axle and coöperating therewith, and connections between the short arms of the levers and the load-carrying member for supporting the rear portion of the load-carrying member, said rear portion of load-carrying member being otherwise without substantial support.

12. In a vehicle, a load-carrying member, a front axle, a rear axle, and connections between the front end of the load-carrying member and the front axle for supporting the load-carrying member at its forward end, in combination with a pair of levers of the first class having arms of unequal length fulcrumed to the load-carrying member, with the long arms of the levers extending from their fulcrums to the rear axle and secured thereto, and the short arms of the levers extending forwardly to substantially the front end of the load-carrying member, and resilient connections between the free ends of said short arms and the load-carrying member for supporting the rear portion of the load-carrying member, said rear portion of the load-carrying member being otherwise without substantial support.

13. In a vehicle, a load-carying member, a front axle, a rear axle, and connections between the front end of the load-carrying member and the front axle for supporting the load-carying member at its forward end, in combination with a pair of levers of the first class having arms of unequal length fulcrumed to the load-carrying member, with the long arms of the levers extending from their fulcrums to the rear axle and coöperating therewith, connections between the short arms of the levers and the load-carrying member for supporting the rear portion of the load-carrying member, and means extending longitudinally of the rear axle and secured to said rear axle and to the load-carrying member for precluding side sway of said load-carrying member, said rear portion of the load-carrying member being otherwise without substantial support.

14. In a vehicle, a load-carrying member, a front axle, a rear axle, and connections between the front end of the load-carrying member and the front axle for supporting the load-carying member at its forward end, in combination with a pair of levers of the first class having arms of unequal length fulcrumed to the load-carrying member, with the long arms of the levers extending from their fulcrums to the rear axle and secured thereto, resilient means coöperating with the short arms of the levers and the load-carrying member for supporting the rear portion of the load-carrying member, and a strap secured at its opposite ends to the rear axle and intermediate its ends to the load-carrying member, whereby side sway of the load-carrying member is precluded.

15. In a vehicle, a load-carrying member, a front axle, a rear axle, and connections between the front end of the load-carrying member and the front axle for supporting the load-carying member at its forward end, in combination with a pair of levers of the first class having arms of unequal length fulcrumed to the load-carrying member, with the long arms of the levers extending from their fulcrums to the rear axle and secured thereto, resilient means coöperating with the short arms of the levers and the load-carrying member for supporting the rear portion of the load-carrying member, and a tension member fixed intermediate its ends to the load-carrying member and shackled at its opposite ends to the rear axle, whereby side sway of the load-carrying member is precluded.

16. In a vehicle, a load-carrying member, a front axle, a rear axle, and connections between the front end of the load-carrying member and the front axle for supporting the load-carrying member at its forward end, in combination with means pivoted to the load-carrying member and provided with arms of unequal length, the fulcrum point of said means being forwardly of the transverse medial line of the load-carrying member, the longer arm of said means coöperating with the rear axle and the shorter arm of said means being resiliently connected to the load-carrying member for supporting the rear portion of said load-carrying member, said rear portion of the load-carrying member being otherwise without substantial support.

17. In a vehicle, a load-carrying member embodying side bars spaced apart by transverse bars, a front axle, a rear axle, a spring interposed between the front axle and the load-carrying member for supporting the forward portion of the load-carrying member directly from the front axle, a pair of levers of the first class having arms of unequal length fulcrumed to the load-carrying member with the long arms of the levers extending from their fulcrums to the rear axle and secured thereto, and the short arms of the levers extending forwardly from their fulcrums to points beneath the side bars of the load-carrying member, a saddle member seated on each side bar of the load-carrying member above the ends of the short arms of the levers, a plurality of tension rods secured to the end of each short arm and extending upwardly through the saddles to points above the same, a spring coiled about each tension member, and enlarged members associated with each tension member and resting at the top of the corresponding spring.

In testimony whereof I have signed my name to this specification.

CHARLES DRABEK.